Oct. 14, 1924.                                                    1,511,370
                        H. W. SANFORD
                    GREASE GUN CONNECTION
                     Filed June 8, 1922                  4 Sheets-Sheet 1
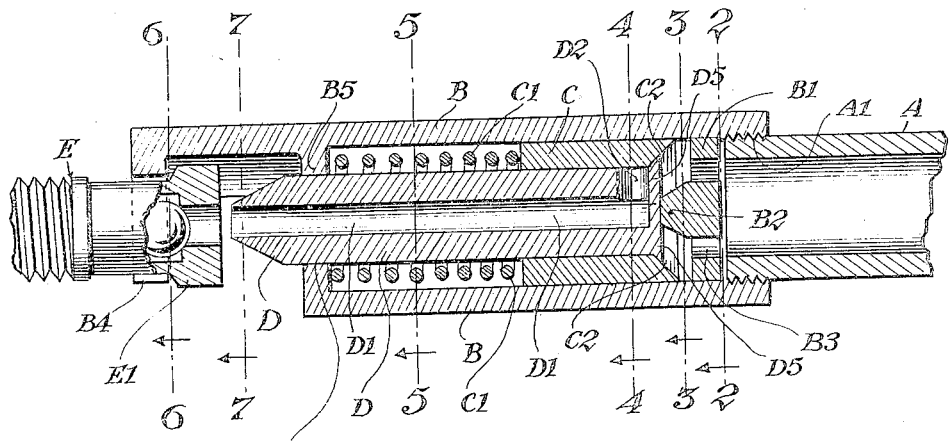
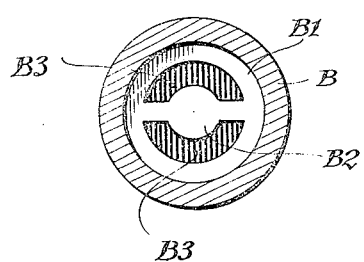 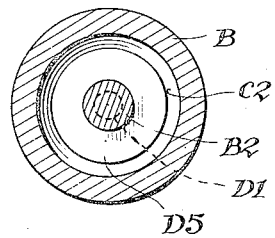 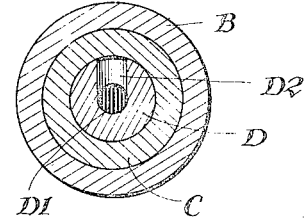
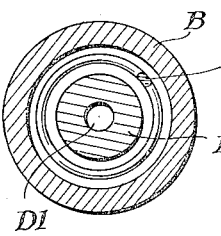 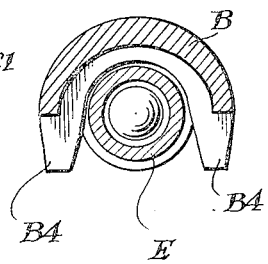 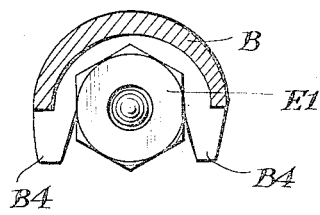
Inventor
Hugh W. Sanford
By Cyrus Kehr
Attorney

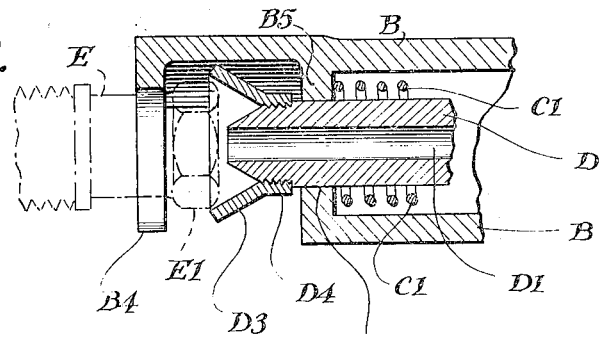
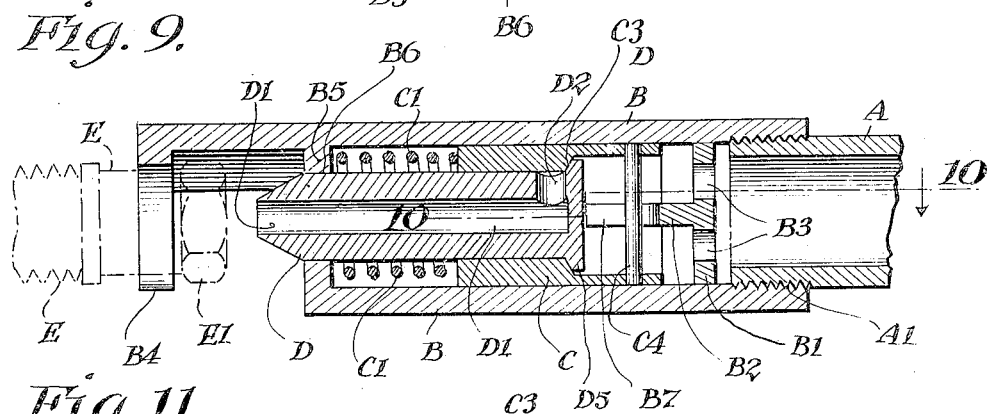
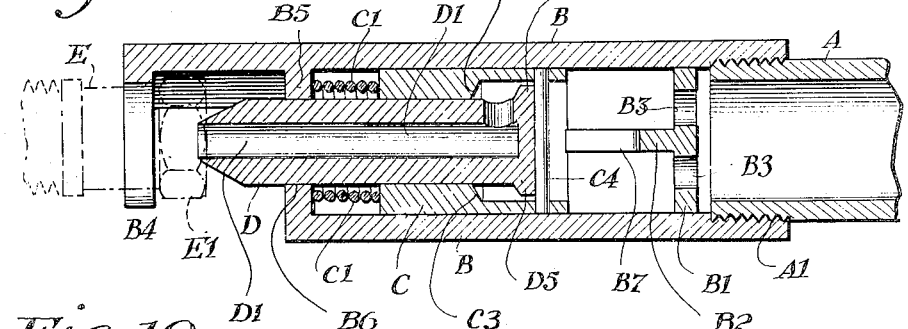
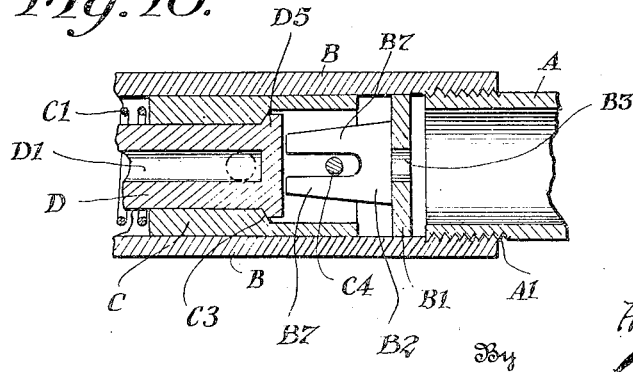

Oct. 14, 1924.

H. W. SANFORD 1,511,370

GREASE GUN CONNECTION

Filed June 8, 1922  4 Sheets-Sheet 3

Inventor
Hugh W. Sanford
By Cyrus Kehr
Attorney

Oct. 14, 1924.  1,511,370
H. W. SANFORD
GREASE GUN CONNECTION
Filed June 8, 1922   4 Sheets-Sheet 4
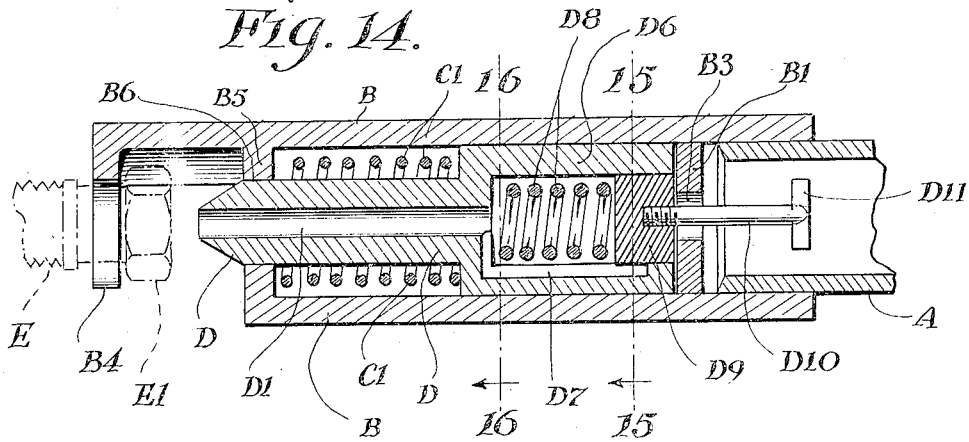
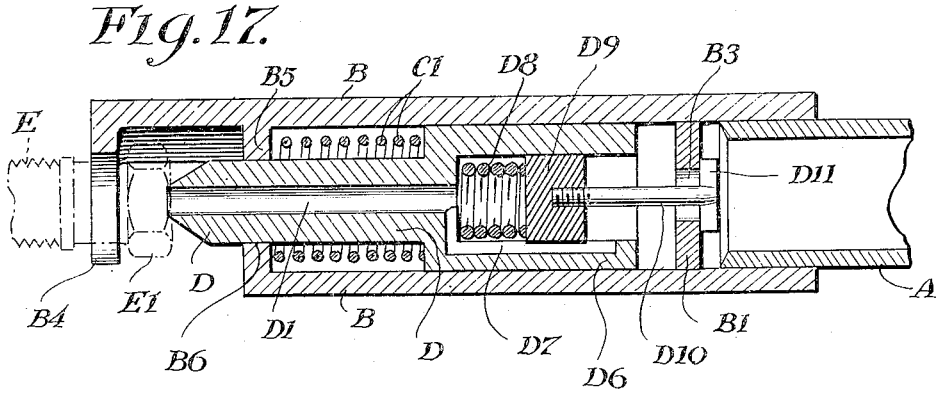
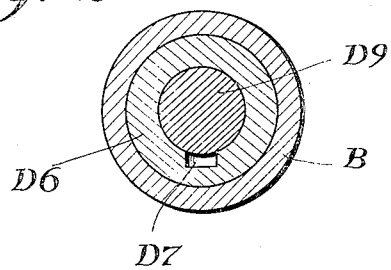 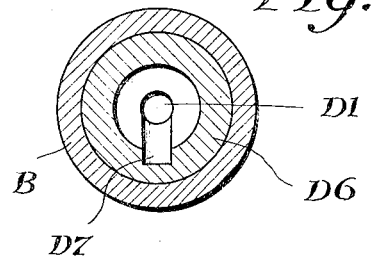

Patented Oct. 14, 1924.

1,511,370

UNITED STATES PATENT OFFICE.

HUGH W. SANFORD, OF KNOXVILLE, TENNESSEE.

GREASE-GUN CONNECTION.

Application filed June 8, 1922. Serial No. 566,790.

*To all whom it may concern:*

Be it known that I, HUGH W. SANFORD, a citizen of the United States, residing at Knoxville, in the county of Knox and State of Tennessee, have invented a new and useful Improvement in Grease-Gun Connections, of which the following is a specification, reference being had to the accompanying drawing.

This improvement relates particularly to grease gun connections having a member or part adapted to engage a grease receiving member and having a tubular nozzle or plunger which is adapted to be moved forward to bear against said receiving member and deliver into said member grease driven forward through the nozzle or plunger.

The object of the invention is to provide a connection which is in compact form and adapted to be placed into operative relation with receiving members located in various positions, including positions affording limited space for bringing the connection to the receiving member.

A further object of the invention is to provide a structure wherein the passage to the nozzle is cut off until grease pressure is applied to the connection and the nozzle has been driven forward and seated against or on the grease receiving member.

In the accompanying drawings,

Fig. 1 is a longitudinal section of a connection embodying my improvement;

Fig. 2 is a transverse section on the line, 2—2, of Fig. 1, looking toward the left;

Fig. 3 is a transverse section on the line, 3—3, of Fig. 1, looking toward the left;

Fig. 4 is a transverse section on the line, 4—4, of Fig. 1, looking toward the left;

Fig. 5 is a transverse section on the line, 5—5, of Fig. 1, looking toward the left;

Fig. 6 is a transverse section on the line, 6—6, of Fig. 1, looking toward the left;

Fig. 7 is a transverse section on the line, 7—7, of Fig. 1, looking toward the left;

Fig. 8 is a detail longitudinal section showing a modification of the form shown by Fig. 1;

Fig. 9 is a longitudinal section similar to Fig. 1, some of the parts being changed;

Fig. 10 is a horizontal section on the line, 10—10, of Fig. 9;

Fig. 11 is a section similar to Fig. 9, the hook and the nozzle being in engagement with a grease receiving member;

Fig. 14 is a longitudinal section similar to Fig. 1, a portion of the parts being in different form;

Fig. 15 is a transverse section on the line, 15—15, of Fig. 14, looking toward the left;

Fig. 16 is a transverse section on the line, 16—16, of Fig. 14, looking toward the left;

Fig. 17 is a view like Fig. 14, excepting that the hook and the plunger are in engagement with a grease receiving member;

Figure 12:
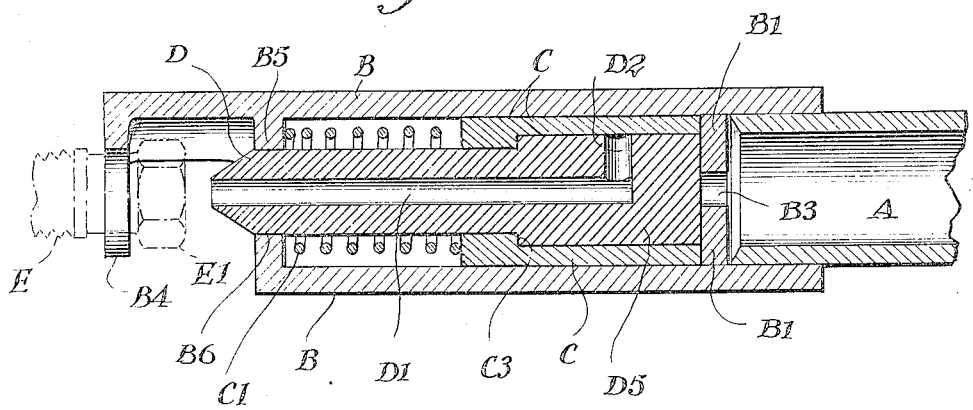
Fig. 12 is a longitudinal section similar to Fig. 1, some of the parts being in different form.

Referring to Figures 1 to 6, inclusive, of said drawings, A is a transmission tube through which grease is driven toward the left by a grease gun. This tube may be the rigid discharge end of a hand grease pump or it may be a flexible tube connected with a hand grease pump or a power grease pump. Said tube, A, is fitted into one end of the tubular body, B, and immovably secured in said body, as by means of threading or solder, A¹. Immediately at the front of the tube, A, the body, B, has a fixed transverse partition, B¹, on the forward face of which is a central, forward-directed abutment, B². At opposite sides of said abutment, said partition has ports, B³, for the forward passing of grease from the tube, A. At its forward end, the body, B, has a forked hook, B⁴, which is adapted to extend to opposite sides of the tubular grease receiving member, E, having a head, E¹, the hook being forward of said head. Rearward of said hook, the body, B, has a forward transverse, fixed partition, B⁵, which has on the axial line of the body, B, a circular opening, B⁶.

Immediately forward of the partition, B¹, is a sleeve, C, fitting slidably against the inner face of the wall of the body, B. Forward of said sleeve is an expanding coiled spring, C¹, of approximately the diameter of said sleeve and having its rear end bearing against said sleeve while its forward end bears against the partition, B⁵, said partition constituting an abutment for said spring. The function of said spring is to hold the sleeve, C, yieldingly against the partition, $B^1$. The rear end of the sleeve, C, has a slanting face, $C^2$, between which and the partition, $B^1$, there is a space which grease may enter and exert pressure on said face tending to move said sleeve forward (toward the left).

A cylindrical nozzle or plunger, D, rests slidably in the sleeve, C, and in the opening, $B^6$, in the partition, $B^5$, the nozzle fitting so closely to the inner face of the sleeve, C, as to prevent the passing of the grease between the sleeve and the nozzle. The abutment, $B^2$, limits the rearward movement of the nozzle, D. From its forward end rearward nearly to the abutment, $B^2$, the nozzle has a bore, $D^1$, extending along the axial line of the nozzle. Near the rear end of the nozzle is a lateral or side admission port, $D^2$, which communicates with the bore, $D^1$, and is normally covered by the sleeve, C, the rear end of the nozzle then resting against the abutment, $B^2$, and the rear end of the sleeve resting against the partition, $B^1$. Thus said sleeve constitutes an admission port covering member.

The forward end of the nozzle, D, may be of any desired form. In the drawing it is shown tapering to adapt it to enter the mouth of the receiving member, E. At its rear end, the nozzle is expanded to form a head, $D^5$, which is adapted to seat on the slanting face, $C^2$, of the sleeve, C, when the head bears against the abutment, $B^2$, or when the nozzle is driven forward in the absence of the receiving member.

The operation is as follows:

The connection is to be applied as shown in Fig. 1 of the drawings, the hook, $B^4$, embracing the neck of the receiving member, E, below the head, $E^1$, of said member, and the nozzle, D, being opposite and near the mouth or port of the receiving member. Grease pressure is now turned on through the transmission tube, A. The grease then passes through the ports, $B^3$, and against the rear end of the nozzle, D, and against the rear end of the sleeve, C. Forward movement of the sleeve being resisted by the coiled spring, $C^1$, and forward movement of the nozzle, D, being resisted by the sleeve, the sleeve and the nozzle move forward together until the nozzle bears against the receiving member, E. The nozzle being now stationary, increasing grease pressure is transmitted to the slanting face, $C^2$, of the sleeve, C, whereby said sleeve is driven forward as far as permitted by the compression of the spring. Such movement uncovers the port, $D^2$, in the nozzle, whereby a continuous passage is formed from the transmission tube, A, through the nozzle and into the receiving member, E.

If pressure is turned on in the transmission tube, A, when the connection is not applied to the receiving member, E, the grease pressure drives the nozzle and the sleeve forward together until the spring, $C^1$, is fully compressed. During such movement and at its termination the port, $D^2$, remains covered. The coils in the spring, $C^1$, are of a number adapted to attain full compression shortly after the sleeve moves forward beyond the position needed for uncovering the port, $D^2$, when the nozzle seats on the receiving member. Since the port, $D^2$, thus remains covered when there is grease pressure during the absence of the receiving member, there can be no discharge of grease through the connection, notwithstanding the grease pressure.

In Fig. 8, the flange, $D^3$, is shown having a sleeve, $D^4$, which surrounds and is threaded to the nozzle, D; and the flange is extended in funnel-form sufficiently to receive the head, $E^1$, when the nozzle is moved forward for seating on said head. In this form said flange serves to center the connection, the axis of the nozzle, D, being brought into alignment with the axis of the receiving member, E. It is intended that when the receiving member is absent and the nozzle, D, and the sleeve, C, are moved forward, the spring, $C^1$, shall become fully compressed before the flange, $D^3$, makes contact with the hook, $B^4$.

In Figs. 9, 10 and 11, the flange, $D^3$, is omitted from the nozzle. On the rear end of the nozzle is a head, $D^5$, adapted to bear against an annular shoulder, $C^3$, formed in the sleeve, C, the interior diameter of the sleeve being made larger from said shoulder rearward. The abutment, $B^2$, is extended forward and is divided to form two branches, $B^7$, against which the head, $D^5$, of the nozzle may bear when the nozzle is in the rear or normal position. Then the spring, $C^1$, has pressed the sleeve, C, rearward, the annular shoulder, $C^3$, bearing against the head, $D^5$, of the nozzle. A cross pin, $C^4$, extends loosely through the space between the arms, $B^7$, of the abutment and has its ends fixed in the sleeve, C.

The operation is as follows:

When grease pressure is applied after the connection has been put into position on the receiving member to make engagement with said member, the pressure of the grease on the head, $D^5$, and on the end of the sleeve, C, drives both of said members forward, the greater area of the head causing a larger application of force to the nozzle and the spring, $C^1$, yieldingly resisting movement of the sleeve. Thus the nozzle and the sleeve move forward in unison until the forward end of the nozzle engages the receiving member. Then forward movement of the nozzle is arrested and forward movement of the sleeve, C, continues until the cross pin, $C^4$, bears against the head, $D^5$, of the nozzle.

In this manner, the forward movement of the sleeve is arrested at a definite point without waiting for the complete compression of the spring, $C^1$. This forward movement of the sleeve independently of the nozzle uncovers the port, $D^2$. If grease pressure is turned on in the absence of the grease receiving member, E, the nozzle and the sleeve are together driven forward until the spring, $C^1$, is fully compressed and arrests the further forward movement of the sleeve, the head of the nozzle remaining seated on the shoulder, $C^3$, of the sleeve, whereby the port, $B^2$, remains covered.

Figure 13:
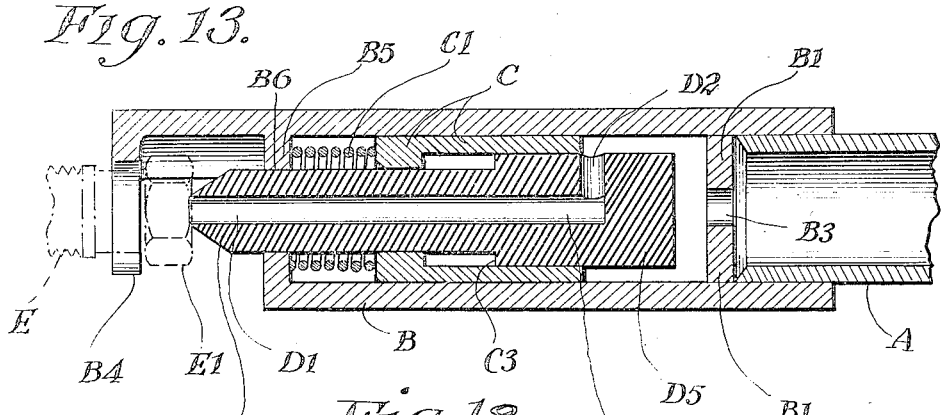
Fig. 13 is a view like Fig. 12 with the movable parts in the forward position, the hook and nozzle engaging a grease receiving member.

In Figs. 12 and 13, the parts closely resemble those of Figs. 9, 10 and 11. The abutment, $B^2$, is absent. The head, $D^5$, of the nozzle rests against the shoulder, $C^3$, of the sleeve, C, and extends rearward against the forward face of the fixed partition, $B^1$, and over the port, $B^3$, which is at the middle of said partition. The bore, $D^1$, of the nozzle extends rearward into the head, $D^5$, and the port, $D^2$, extends laterally from the rear end of the bore, $D^1$, through the head. The operation of this form is as follows:

When the connection is applied to the grease receiving member, the hook, $B^4$, being at one side and the forward end of the nozzle being at the other side of the head, $E^1$, and grease pressure is applied, the grease passes forward through the port, $B^3$, and pushes the nozzle, D, forward, the latter carrying with it the sleeve, C, until the forward movement of the nozzle is arrested by contact with the grease receiving member. Thereafter pressure of the grease against the rear end of the sleeve, C, drives said sleeve forward, independently of the nozzle, until the full compression of the spring, $C^1$, arrests the movement of the sleeve. That movement is far enough to uncover the port, $D^2$.

In Figs. 14, 15, 16 and 17, the body, B, the partitions, $B^1$ and $B^5$ and the hook, $B^4$, and the spring, $C^1$, are the same as in the other forms; but the sleeve, C, is absent.

Between the spring, $C^1$, and the cross partition, $B^1$, the nozzle has a tubular head, $D^6$, which fills the space within the body, B, and bears against the cross partition, $B^1$, and is open at its rear end. Approximately the rear half of the tubular chamber in the head is occupied by a slidable, cylindrical plug or block, $D^9$. The part of said chamber forward of said plug is occupied by an expanding coiled spring, $D^8$, which offers greater resistance to compression than does the spring, $C^1$. Forward of the cross partition, $B^1$, and approximately at the middle of the horizontal face of the plug, $D^9$, is a channel-form side port, $D^7$, cut into the inner face of the head, $D^6$, and extended forward to the forward end of said chamber and then inward to the bore, $D^1$, of the nozzle. Thus said port passes the space occupied by the spring, $D^8$, and then connects with the bore, $D^1$. The screw, $D^{10}$, extends through the port, $B^3$, in the partition, $B^1$, and is threaded into the plug, $D^9$. The port, $D^3$, is made large enough to allow passing of grease around the stem of said screw. The distance between the head of the screw and said plug is such as to avoid contact between said head and the partition, $B^1$, when the forward end of the nozzle is seated on the receiving member. The parts are so proportioned as that the spring, $C^1$, will not reach full compression when the nozzle seats on the receiving member. But when, in the absence of the receiving member, the nozzle is driven forward, such movement continues until the spring, $C^1$, is under full compression. Then the rear end of the port, $D^7$, is so far forward as to avoid uncovering of said port by the forward movement of the plug, $D^9$; for then the head, $D^{11}$, of the screw, $D^{10}$, will engage the partition, $B^1$, and arrest the forward movement of the plug, $D^9$, before said plug has uncovered said port.

The operation of this form is as follows:

When the connection has been put into position with the hook at one side and the forward end of the nozzle at the other side of the head of the grease receiving member, and grease pressure is turned on, then the pressure of the grease on the rear face of the plug, $D^9$, and on the rear annular face of the head, $D^6$, drives said plug and the nozzle forward until the forward movement of the nozzle is arrested by engagement with the receiving member. During such movement the plug, $D^9$, remains substantially stationary relative to the head, $D^6$, of the nozzle, the spring, $C^1$, yielding to power which is not sufficient to materially compress the spring, $D^8$. But when the forward movement of the nozzle ceases, further grease pressure against the rear face of the plug, $D^9$, will drive said plug forward until such movement is arrested by full compression of the spring, $D^8$. When said plug has been driven into that position, its rear part has moved far enough to uncover the rear end of the channel-form port, $D^7$ there still being a space between the screw head, $D^{11}$, and the partition, $D^1$. Then there is a continuous passage for grease from the transmission tube, A, through the port, $B^3$, the port, $D^7$, and the bore, $D^1$, into the receiving member.

If grease pressure is applied in the absence of the receiving member, the nozzle and the plug, $D^9$, will be driven forward until the spring, $C^1$, is under full compression and the screw head, $D^{11}$, engages the partition, $B^1$, at which time the side port, $D^7$, is still covered by the plug, $D^9$, and the port, $B^3$, is covered by the head, $D^{11}$.

Figure 18:
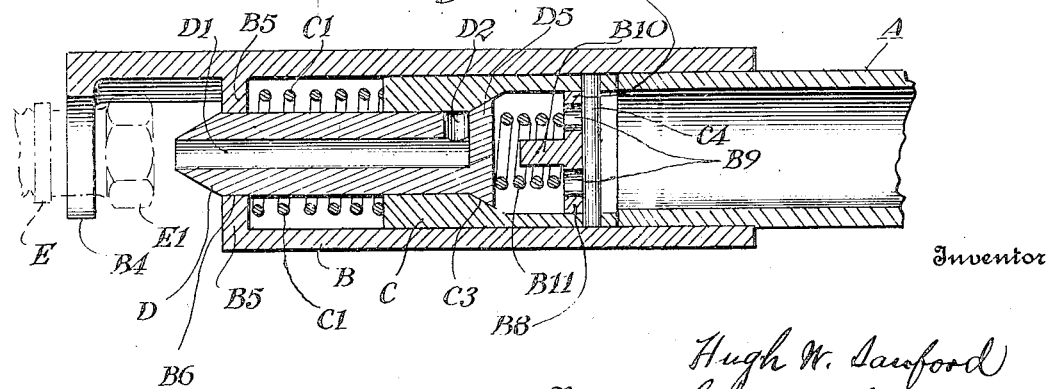
Fig. 18 is a longitudinal section of a form similar to the form shown by Figs. 9, 10 and 11.

In Fig. 18, the parts are the same as in

Figs. 9, 10 and 11, excepting that the cross partition, B³, is put into the sleeve, C, between the cross pin, C⁴, and the head, D⁵, of the nozzle, D, and is given the symbol, B⁸, and its ports being given the symbol, B⁹. On said partition is a stud, B¹⁰. Said stud is surrounded by an expanding coiled spring, B¹¹, which constantly bears against said partition and against the head, D⁵, of the nozzle, D, and tends to keep said head seated on the annular shoulder, C³. Normally the spring, C¹, presses the sleeve, C, rearward against the tube, A. When the parts have been pressed forward to bring the forward end of the nozzle into engagement with the grease receiving member, the spring, B¹¹, tends to hold the nozzle in such position, while the sleeve, C, continues forward movement until the stud, B¹⁰, bears against the head, D⁵. Then all the parts are at rest, the port, D², having been uncovered by the forward movement of the sleeve, C, after the nozzle has been brought to rest.

It is to be understood that after any one of the various forms of structure above described has been operated for driving grease into a receiving member, the grease pressure in the tube, A, is to be reduced sufficiently to allow the springs to return the parts with which they are associated into normal position.

I claim as my invention,

1. In a grease gun connection, the combination of a tubular body, means for engaging said body relative to a grease receiving member, a nozzle located in said body and movable endwise by grease pressure to bear against the receiving member and having near its rear end an admission port, a port-covering member adapted to be moved from said port by grease pressure after the nozzle has been moved forward into and held in its seating position, and a spring tending to press said port-covering member over said port, substantially as described.

2. In a grease gun connection, the combination of a tubular body, means for engaging said body relative to a grease receiving member, a nozzle located in said body and movable endwise by grease pressure to bear against the receiving member and having near its rear end a side admission port, a port-covering member adapted to be moved from said port by grease pressure after the nozzle has been moved forward into and held in its seating position, and a spring tending to press said port-covering member over said port, substantially as described.

3. In a grease gun connection, the combination of a tubular body, means for engaging said body relative to a grease receiving member, a nozzle located in said body and movable endwise by grease pressure to bear against the receiving member and having near its rear end a side admission port, a port-covering member external to the nozzle and adapted to be moved from said port by grease pressure after the nozzle has been moved forward into and held in its seating position, and a spring tending to press said port-covering member over said port, substantially as described.

4. In a grease gun connection, the combination of a tubular body, means for engaging said body relative to a grease receiving member, a nozzle located in said body and movable endwise by grease pressure to bear against the receiving member and having near its rear end an admission port, a port-covering member consisting of a slidable sleeve surrounding the nozzle and adapted to be moved from said port by grease pressure after the nozzle has been moved forward into and held in its seating position, and a spring tending to press said slidable sleeve over said port, substantially as described.

5. In a grease gun connection, the combination of a tubular body, means for engaging said body relative to a grease receiving member, a nozzle located in said body and movable endwise by grease pressure to bear against the receiving member and having near its rear end an admission port, a port-covering member adapted to be moved from said port by grease pressure after the nozzle has been moved forward into and held in its seating position, a spring tending to press said port-covering member over said port, and means for limiting the rearward movement of the nozzle and the port-covering member, substantially as described.

6. In a grease gun connection, the combination of a tubular body, means for engaging said body relative to a grease receiving member, a nozzle located in said body and movable endwise by grease pressure to bear against the receiving member and having near its rear end an admission port, a port-covering member adapted to be moved from said port by grease pressure after the nozzle has been moved forward into and held in its seating position, a spring tending to press said port-covering member over said port, and a cross-partition and a forward-directed abutment on said partition, substantially as described.

7. In a grease gun connection, the combination of a tubular body, means for engaging said body relative to a grease receiving member, a transverse partition in the forward end of said body, a nozzle slidable in said transverse partition and movable by endwise grease pressure to bear against the receiving member and having near its rear end an admission port, a port-covering member adapted to be moved from said port by grease pressure after the nozzle has been moved forward into and held in its seating position, and an expanding coiled spring surrounding the nozzle between said transverse partition and said port-covering member, substantially as described.

8. In a grease gun connection, the combination of a tubular body, means for engaging said body relative to a grease receiving member, a nozzle located in said body and movable endwise by grease pressure to bear against the receiving member and having near its rear end an admission port, a port-covering member adapted to be moved from said port by grease pressure after the nozzle has been moved forward into and held in its seating position, a spring tending to press said port-covering member over said port, and means for limiting the movement of the port covering member relative to the forward movement of the nozzle while the receiving member is absent whereby uncovering of the admission port of the nozzle is avoided, substantially as described.

9. In a grease gun connection, the combination of a tubular body, means for engaging said body relative to a grease receiving member, a transverse partition in the forward end of said body, a nozzle slidable in said transverse partition and movable by endwise grease pressure to bear against the receiving member and having near its rear end an admission port, a port-covering member adapted to be moved from said port by grease pressure after the nozzle has been moved forward into and held in its seating position, and an expanding coiled spring surrounding the nozzle between said transverse partition and said port-covering member, said spring being of form to adapt it to come to full compression and arrest the forward movement of the port-covering member and the nozzle being movable forward far enough in the absence of the receiving member to avoid uncovering of said port by the port-covering member, substantially as described.

In testimony whereof I have signed my name, this fifth day of May, in the year one thousand nine hundred and twenty-two.

HUGH W. SANFORD.